United States Patent
Konishi et al.

[11] Patent Number: 6,057,968
[45] Date of Patent: May 2, 2000

[54] EYEPIECE SYSTEM

[75] Inventors: Hirokazu Konishi, Hachioji; Hirofumi Tsuchida, Kunitachi, both of Japan

[73] Assignee: Olympus Optical Co., Ltd., Tokyo, Japan

[21] Appl. No.: 08/948,817

[22] Filed: Oct. 10, 1997

[30] Foreign Application Priority Data

Oct. 11, 1996 [JP] Japan ................................. 8-287290

[51] Int. Cl.$^7$ .............................. G02B 3/00; G02B 25/00
[52] U.S. Cl. ........................... 359/654; 359/646; 359/647
[58] Field of Search .............................. 359/654, 643–647

[56] References Cited

U.S. PATENT DOCUMENTS

| 5,117,308 | 5/1992 | Tsuchida et al. | 359/654 |
| 5,166,827 | 11/1992 | Noda | 359/652 |
| 5,546,229 | 8/1996 | Aoki | 359/654 |
| 5,841,586 | 11/1998 | Nagaoka | 359/654 |

FOREIGN PATENT DOCUMENTS

| 62-32414 | 2/1987 | Japan. |
| 6-337347 | 12/1994 | Japan. |

OTHER PUBLICATIONS

Applied Optics Feb. 1, 1983/vol. 22.No. 3, Gradien–Index Eyepiece Design, Jill D. Forer et al, pp. 407–412.

*Primary Examiner*—Scott J. Sugarman
*Assistant Examiner*—Jordan M. Schwartz
*Attorney, Agent, or Firm*—Pillsbury Madison & Sutro LLP

[57] ABSTRACT

An eyepiece system comprising a single radial type gradient index lens which has a refractive index varying dependently on distances from an optical axis in a radial direction and a negative power. This eyepiece system is composed of a small number of lenses, and has chromatic aberration, curvature of field, spherical aberration, etc. which are corrected favorably.

10 Claims, 2 Drawing Sheets

EYEPIECE SYSTEM

BACKGROUND OF THE INVENTION a) Field of the Invention

The present invention relates to an eyepiece system which is to be used in telescopes and microscopes or as a magnifying lens for observing magnified images of objects.

b) Description of the Prior Art

Ramsden type eyepiece systems and Kellner type eyepiece systems are known as eyepiece systems which are to be used in telescopes and microscopes, and have simple compositions. Each of these type eyepiece systems is composed of a lens which is disposed on a side near an eye (eye lens) and a field lens is disposed near an image to be magnified.

The Ramsden type eyepiece system is composed of an eye lens which is composed of a total of two lens elements, i.e., an eye lens which is composed of a single lens element and a field lens which is composed of a single lens element, whereas the Kellner type eyepiece system is composed of a total of three lens elements, i.e., an achromatic cemented lens which is adopted as the eye lens for correcting lateral chromatic aberration and a field lens which is composed of a single lens element.

The conventional Ramsden type eyepiece system in which the eye lens is composed of a single homogeneous lens element produces chromatic aberration, curvature of field and spherical aberration in large amounts. When an aspherical surface is used in this eyepiece system, it can correct spherical aberration but cannot correct chromatic aberration and curvature of field. The Kellner type eyepiece system which uses the achromatic cemented lens as the eye lens is capable of favorably correcting chromatic aberration and spherical aberration, but produces curvature of field in an amount too large for correction. Further, the Kellner type eyepiece system has a defect that it requires a high maufacturing cost due to the fact that the eye lens is configured as the achromatic cemented lens.

Furthermore, Japanese Patent Kokai Publication No. Sho 62-32414 discloses an eyepiece system which uses a radial type gradient index lens (radial type GRIN lens) but produces spherical aberration and curvature of field in large amounts. No description is made of chromatic aberration in this publication. As eyepiece systems which use new lens materials, there are known those which use radial type gradient index lenses which have refractive indices varying dependently on distances in radial directions (radial type GRIN lenses) like the eyepiece systems disclosed by Japanese Patents Kokai Publication No. Sho 62-32414 and Kokai Publication No. Hei 6-337347. Out of the eyepiece systems mentioned as the conventional examples, an eyepiece system composed of two radial type GRIN lenses, and another eyepiece system composed of a radial type GRIN lens and a homogeneous lens are known as eyepiece systems which are composed of a small number of lenses.

Furthermore, a lens system described in Applied Optics Vol. 22 pp.on and after 407 is known as an eyepiece system using an axial type GRIN lens whose refractive index varies in a direction along an optical axis (in a direction of thickness of a lens). This literature describes examples in which axial type GRIN lenses are applied to Ramsden type eyepiece systems and Kellner type eyepiece systems.

Moreover, another eyepiece system using a radial type GRIN lens which is disclosed by Japanese Patent Kokai Publication No. Hei 6-337347 has a defect that when it is configured to have favorable optical performance within a wide visual field, it has a long outside diameter and refractive indices which are largely different between an axial portion and a marginal portion thereof, whereby it can hardly be manufactured in practice.

In addition, design examples of eyepiece systems using the axial type GRIN lenses described in the above-mentioned literature exhibit aberration correcting effects which are on the order similar to those of the conventional Ramsden type and Kellner type eyepiece systems using aspherical surfaces, and have a defect that they are incapable of correcting curvature of field and chromatic aberration.

SUMMARY OF THE INVENTION

A primary object of the present invention is to provide an eyepiece system which is composed of a small number of lenses, can be manufactured at a low cost, has favorably corrected aberrations such as chromatic aberration, curvature of field and spherical aberration, and is to be used in telescopes and microscopes or an eyepiece system which is optimum for use as a magnifying lens for observing magnified images of objects.

The eyepiece system according to the present invention which has a first composition is characterized in that it is composed of a single gradient index lens whose refractive index varies dependently on distances from an optical axis in a radial direction and that a medium of the gradient index lens has a negative power.

The eyepiece system according to the present invention which has a second composition is characterized in that it is composed of a first lens unit comprising at least one gradient index lens which has a refractive index varying dependently on distances from an optical axis in a radial direction and is made of a medium having a negative power, and a second lens unit comprising at least one homogeneous lens which has a positive power and a biconvex shape.

DETAILED DESCRIPTION OF THE PREFERRED EMBODIMENTS

Figure 1:
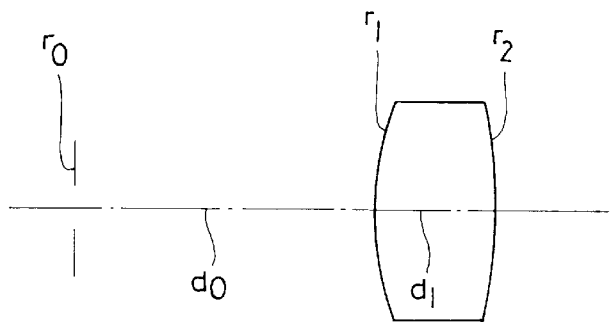
FIGS. 1 through 6 show sectional views illustrating the composition of first through sixth embodiments of the eyepiece system according to the present invention, respectively.

The eyepiece system which has a first composition according to the present invention is characterized in that it comprises one radial type gradient index lens which varies a refractive index dependently on distances in a radial direction from an optical axis (radial type GRIN lens) and that this radial type GRIN lens has a negative power.

A refractive index distribution $N(r)$ of such a radial type GRIN lens is expressed by the following formula (a):

$$N(r) = N_{00} + N_{10}r^2 + N_{20}r^4 + \ldots \quad (a)$$

wherein the reference symbol $r$ represents a radial distances from the optical axis, the reference symbol $N_{00}$ designates a refractive index on the optical axis, and the reference symbols $N_{10}$ and $N_{20}, \ldots$ denote coefficients of the second, fourth, ... orders respectively.

The coefficients $N_{10}, N_{20}, \ldots$ have values which vary dependently on wavelengths. When these coefficients are suffixed with wavelengths so that the coefficients for the d-line, F-line and C-line are expressed as $N_{i0d}, N_{i0F}$ and $N_{i0C}$, for example, an Abbe's number of a radial type GRIN lens is as follows:

$$V_{00} = (N_{00d} - 1)/(N_{00F} - N_{00C})$$

$$V_{i0} = N_{i0d}/(N_{i0F} - N_{i0C}) (i=1, 2, 3, \ldots)$$

Further, a Petzval's sum PTZ of a thin radial type GRIN lens and longitudinal chromatic aberration PAC are expressed by the following formulae (b) and (c):

$$PTZ = \phi_S/N_{00} + \phi_M/N_{00}^2 \quad (b)$$

$$PAC = K(\phi_S/V_{00} + \phi_M/V_{10}) \quad (c)$$

wherein the reference symbol OS represents a refractive power of surface, the reference symbol OM represents a refractive power of medium and, the reference symbol K designates a coefficient which is dependent on a height of ray and an angle of a final paraxial ray.

As seen from the formulae (b) and (c) shown above, a remarkable characteristic of a radial type GRIN lens lies in its capability to correct a Petzval's sum and chromatic aberration.

The eyepiece system according to the present invention is composed of a single radial type GRIN lens as described above, and configured to favorably correct chromatic aberration and curvature of field by imparting a negative refractive power to a medium of the radial type GRIN lens.

When a lens is made of a homogeneous glass material, aberrations are produced by refraction of rays on surfaces of the lens. Accordingly, aberrations are produced in large amounts by each lens surface when a lens system is composed of a small number of lenses and rays are refracted at large angles on each lens surface. For this reason, aberrations are reduced in a lens system as a whole by increasing a number of lenses so that rays are refracted at small angles and each lens surface produces aberrations in small amounts. Further, a number of lenses must be further increased for correcting curvature of field since lens surfaces having relatively strong negative powers are required for correction of curvature of field.

The eyepiece system according to the present invention is configured to correct curvature of field without imparting a negative power to lens surfaces by using the radial type GRIN lens and imparting a negative power to a medium thereof. In this case, amounts of aberrations produced by each surface can be reduced since each lens surface can have a positive power for sharing a power. In other words, the eyepiece system according to the present invention is configured to be composed of a small number of lenses and favorably correct aberrations including curvature of field by imparting a negative power to the medium. Accordingly, the eyepiece system according to the present invention which is composed of a single radial type GRIN lens is capable of correcting chromatic aberration and curvature of field.

When a dispersion distribution coefficient of the gradient index lens of the eyepiece system according to the present invention is represented by $V_{10}$, it is desirable for favorable correction of chromatic aberration to satisfy the following condition (1):

$$0 < V_{10} < V_{00} \quad (1)$$

wherein the reference symbol $V_{00}$ represents an Abbe's number on the optical axis of GRIN lens element and the reference symbol $V_{10}$ designates a value which is given by the following formula:

$$V_{10} = N_{10d}/(N_{10F} - N_{10C})$$

wherein the reference symbols $N_{10d}$, $N_{10F}$ and $N_{10C}$ represent coefficients $N_{10}$ of the refractive index distribution of the second order of radial type GRIN lens expressed by the above-mentioned formula (a) for the d-line, F-line and C-line.

As seen from the above-mentioned formula (c), $V_{10}$ is a value which is important for correcting chromatic aberration and it is possible to correct chromatic aberration by controlling a value of $V_{10}$.

When $V_{10}$ is within the range defined by the above-mentioned condition (1), a dispersion distribution is a high dispersion distribution and a medium produces chromatic aberration in a large amount. When this fact is utilized, it is possible to perform optimum correction of chromatic aberration in a lens system by cancelling chromatic aberration produced by positive powers of lens surfaces with chromatic aberration produced in a reverse direction by a negative power of medium.

If the upper limit of the condition (1) is exceeded, the dispersion distribution will be low dispersion and an amount of chromatic aberration produced by a medium will be reduced, thereby making it impossible to perform optimum correction of chromatic aberration. If $V_{10}$ has a negative value which beyond the lower limit of the condition (1), in contrast, chromatic aberration produced by a medium will have a sign which is same as that of chromatic aberration produced by lens surfaces, thereby making it impossible to correct chromatic aberration.

Further, it is desirable for enhancing productivity of the eyepiece system according to the present invention to configure the radial type GRIN lens so as to has thickness d satisfying the following condition (2):

$$d \geq 4 \text{ mm} \quad (2)$$

Since the eyepiece system according to the present invention has a wide visual field, it has a large outside diameter. This is because a ray is farther from the optical axis as an image height to be observed is higher though a ray at a center of the visual field passes through a center of the eyepiece system.

Generally speaking, a gradient index lens which has a large outside diameter has a large refractive index difference $\Delta N$ between a vicinity of the optical axis and a most marginal portion and can hardly be manufactured in practice. For reducing a value of $\Delta N$ it is desirable to largely refract offaxial rays not by enlarging a value of $\Delta N$ but by thickening the gradient index lens. The condition (2) mentioned above is required for thickening the radial type GRIN lens.

If the lower limit of 4 mm of the condition (2) is exceeded, a value of $\Delta N$ must be enlarged for obtaining an eyepiece system having a wide visual field, thereby making it difficult to manufacture the radial type GRIN lens in practice.

Furthermore, it is desirable for correcting astigmatism and spherical aberration with good balance in the eyepiece system according to the present invention that the refractive index distribution coefficient $N_{20}$ of the fourth order of the radial GRIN lens satisfies the following condition (3):

$$0 < N_{20}/\phi^4 < 8 \quad (3)$$

wherein the reference symbol $\phi$ represents a refractive power of the eyepiece system.

By varying a value of the coefficient of the fourth order $N_{20}$, it is possible to vary balance between spherical aberration and astigmatism without changing a power distribution in the eyepiece system as a whole. Though spherical aberration can be overcorrected by selecting a large positive value for $N_{20}/\phi^4$, a marginal image surface will be tilted remarkably in the positive direction and astigmatism will be aggravated if the upper limit of 8 of the condition (3) is exceeded. If the lower limit of 0 of the condition (3) is not satisfied, in contrast, spherical aberration will be remarkably undercorrected and can hardly be corrected.

The eyepiece system according to the present invention having the second composition is composed, as described above, of the first lens unit comprising at least one gradient index lens which is made of a medium having a negative power and varies a refractive index dependently on radial distances from the optical axis, and the second lens unit comprising at least one homogeneous lens which has a positive power and a biconvex shape. Optimum correction of chromatic aberration and curvature of field is possible by selecting the composition described above for the eyepiece system.

The eyepiece system according to the present invention which uses the radial type GRIN lens made of the medium having the negative power makes it unnecessary to impart negative powers to lens surfaces and makes it to share a positive power between the lens surfaces by imparting positive powers to the lens surfaces, thereby being capable of reducing amounts of aberrations to be produced by each lens surface. Accordingly, the eyepiece system can be composed of a reduced number of lenses without unreasonably imparting negative powers to the lens surfaces and with curvature of field corrected favorably.

However, aberrations are produced in larger amounts as an image height is higher, it is necessary for the eyepiece system to use a lens unit which comprises at least one positive homogeneous lens which has a positive power and a biconvex shape in addition to the radial type GRIN lens. It is preferable that this lens unit (first lens unit) comprises at least one biconvex homogeneous lens so as not to enhance image heights and has a function to prevent aberrations from being produced by offaxial rays as far as possible. If the homogeneous lens which has the positive power has a meniscus shape in place of the biconvex shape, it cannot lower heights of rays sufficiently, thereby making it difficult to correct aberrations produced by the offaxial rays.

For the eyepiece system according to the present invention having the first composition which consists of a single radial type GRIN lens or the second composition which consists of the first lens unit comprising a radial type GRIN lens and the second lens unit comprising a biconvex homogeneous lens, it is desirable that a radial type GRIN lens has dispersion distribution coefficients $V_{10}, V_{20}, \ldots$ not exceeding an Abbe's number on the optical axis.

Chromatic aberration can be corrected more favorably when the condition (1) is satisfied even in a case where the eyepiece system according to the present invention has the second composition, i.e., in a case where it is composed of the first lens unit comprising a radial type GRIN lens and the second lens unit comprising a biconvex homogeneous lens.

Further, a radial type GRIN lens has improved productivity when the eyepiece system according to the present invention which has the second composition satisfies the above-mentioned condition (2).

Furthermore, it is preferable for correcting astigmatism and spherical aberration with good balance that the eyepiece system according to the present invention which has the second composition satisfies the above-mentioned condition (3).

Moreover, it is desirable for the eyepiece system according to the present invention which has the second composition that at least one aspherical surface is disposed in the second lens unit comprising a homogeneous lens.

Generally speaking, distortion, pupil aberration, pupil chromatic aberration and so on are produced by lens surfaces having strong positive powers in a lens unit composed of homogeneous lenses. In the case of an eyepiece system which has a wide visual field and is composed of a small number of lenses, the aberrations mentioned above cannot be corrected with a negative power of medium or it is impossible to correct these aberrations without enlarging the refractive index difference $\Delta N$ between the vicinity of an optical axis and a most marginal portion until it exceeds a manufacturing limit. For optimum correction of distortion, pupil aberration and pupil chromatic aberration to use at least one aspherical surface in the second lens unit which comprises a homogeneous lens.

When at least one aspherical surface is disposed in the second lens unit comprising a homogeneous lens of the eyepiece system which has the second composition, it is desirable to satisfy, in place of the condition (3), the following condition (3-1):

$$-5 < N_{20}/\phi^4 < 0 \qquad (3\text{-}1)$$

When at least one aspherical surface is disposed in the second lens unit which comprises a homogeneous lens, distortion, pupil aberration and pupil chromatic aberration can be corrected with this aspherical surface. Accordingly, this aspherical surface lightens the burden for correction of aberrations which is imposed on the refractive index distribution coefficient of the fourth order $N_{20}$ of the radial type GRIN lens. When an aspherical surface is disposed, it is therefore undesirable to select a positive value for $N_{20}$ since it aggravates astigmatism though spherical aberration can be overcorrected. For this reason, it is desirable to select for $N_{20}/\phi^4$ a value which satisfies the condition (3-1) in place of the condition (3).

If the upper limit of 0 of the condition (3-1) is exceeded, a meridional image surface will be remarkably tilted in the positive direction, thereby aggravating astigmatism. If the lower limit of −5 of the condition (3-1) is exceeded, in contrast, spherical aberration is excessively undercorrected, thereby making it impossible to correct spherical aberration.

In addition, it is possible to facilitate working, assembly and adjustment of the eyepiece system according to the present invention by selecting a shape of a plane parallel plate for a radial type GRIN lens.

Numerical data for the embodiments of the eyepiece system according to the present invention will be shown below:

Embodiment 1
   Field number = 12,    f = 25,    F/12.5
$r_0 = \infty$ (stop)
   $d_0 = 15$
$r_1 = 16.0286$
   $d_1 = 6.225$    $n_1$ (gradient index lens)
$r_2 = -26.1027$
   Gradient index lens

| | $N_{00}$ | $N_{10}$ | $N_{20}$ |
|---|---|---|---|
| d line | 1.5 | $0.7 \times 10^{-3}$ | $0.13526 \times 10^{-4}$ |

$V_{00} = 55$,           $V_{10} = 9$
   $N_{20}/\phi^4 = 5.28$,    $\phi^4 = 2.56 \times 10^{-6}$ -continued Embodiment 2
    Field number = 12,    f = 25,    F/12.5
$r_0 = \infty$ (stop)
    $d_0 = 15$
$r_1 = 15.444$
    $d_1 = 5$    $n_1 = 1.51633$    $\nu_1 = 64.15$
$r_2 = -34.233$
    $d_2 = 0.2$
$r_3 = \infty$
    $d_3 = 6.02$    $n_2$ (gradient index lens)
$r_4 = \infty$
    Gradient index lens
        $N_{00}$    $N_{10}$    $N_{20}$
    d line    1.5    $0.7 \times 10^{-3}$    $0.13526 \times 10^{-4}$
    $V_{00} = 55$,    $V_{10} = 9$
    $N_{20}/\phi^4 = 5.28$,    $\phi^4 = 2.56 \times 10^{-6}$
Embodiment 3
    Field number = 20,    f = 25,    F/12.5
$r_0 = \infty$ (stop)
    $d_0 = 20$
$r_1 = \infty$
    $d_1 = 10$    $n_1$ (gradient index lens)
$r_2 = -25.3473$
    $d_2 = 1.34$
$r_3 = 130.5629$
    $d_3 = 6.89$    $n_2 = 1.72342$    $\nu_2 = 37.95$
$r_4 = -38.7464$
    $d_4 = 2$
$r_5 = 41.8416$
    $d_5 = 5.78$    $n_3 = 1.80518$    $\nu_3 = 25.43$
$r_6 = 30.1216$
    Gradient index lens
        $N_{00}$    $N_{10}$    $N_{20}$    $N_{30}$
    d line  1.5  $1.984 \times 10^{-5}$  $1.1087 \times 10^{-6}$  $2.3745 \times 10^{-9}$
    $V_{00} = 55$,    $V_{10} = 4.1783 \times 10^{-1}$
    $N_{20}/\phi^4 = 0.433$,    $\phi^4 = 2.56 \times 10^{-6}$
Embodiment 4
    Field number = 20,    f = 25,    F/12.5
$r_0 = \infty$ (stop)
    $d_0 = 20$
$r_1 = \infty$
    $d_1 = 8$    $n_1$ (gradient index lens)
$r_2 = \infty$
    $d_2 = 0.5$
$r_3 = 123.2695$
    $d_3 = 6.89$    $n_2 = 1.72342$    $\nu_2 = 37.95$
$r_4 = -22.7375$
    $d_4 = 2$
$r_5 = 27.351$
    $d_5 = 6.3$    $n_3 = 1.80518$    $\nu_3 = 25.43$
$r_6 = 23.6468$
    Gradient index lens
        $N_{00}$    $N_{10}$    $N_{20}$    $N_{30}$
    d line  1.5  $2.145 \times 10^{-5}$  $2.7206 \times 10^{-6}$  $-2.3262 \times 10^{-9}$
    $V_{00} = 55$,    $V_{10} = 2.6227 \times 10^{-1}$
    $N_{20}/\phi^4 = 1.06$,    $\phi^4 = 2.56 \times 10^{-6}$
Embodiment 5
    Field number = 20,    f = 25,    F/12.5
$r_0 = \infty$ (stop)
    $d_0 = 19$
$r_1 = \infty$
    $d_1 = 7$    $n_1$ (gradient index lens)
$r_2 = -39.6701$
    $d_2 = 0.5$
$r_3 = 25.9835$    (aspherical surface)
    $d_3 = 6.46$    $n_2 = 1.52559$    $\nu_2 = 56.45$
$r_4 = -30.0446$
    Gradient index lens
        $N_{00}$    $N_{10}$    $N_{20}$    $N_{30}$
    d line  1.5  $6.8196 \times 10^{-4}$  $-4.74 \times 10^{-6}$  $7.3795 \times 10^{-9}$
    $V_{00} = 55$,    $V_{10} = 10.186$
    Aspherical surface coefficients
        K = 0
        $A_4 = -8.3989 \times 10^{-5}$,  $A_6 = 2.2348 \times 10^{-7}$,
        $A_8 = -4.6666 \times 10^{-9}$
    $N_{20}/\phi^4 = -1.85$,    $\phi^4 = 2.56 \times 10^{-6}$
Embodiment 6
    Field number = 20,    f = 25,    F/12.5
$r_0 = \infty$ (stop)
    $d_0 = 19$
$r_1 = \infty$
    $d_1 = 4$    $n_1$ (gradient index lens)
$r_2 = \infty$
    $d_2 = 0.45$
$r_3 = 22.918$    (aspherical surface)
    $d_3 = 6.64$    $n_2 = 1.52559$    $\nu_2 = 56.45$
$r_4 = -26.341$
    Gradient index lens
        $N_{00}$    $N_{10}$    $N_{20}$    $N_{30}$
    d line  1.5  $8.0147 \times 10^{-5}$  $-5.6746 \times 10^{-6}$  $8.9389 \times 10^{-9}$
    $V_{00} = 55$,    $V_{10} = 1.47$
    Aspherical surface coefficients
        K = 0
        $A_4 = -9.7554 \times 10^{-5}$,  $A_6 = 2.3194 \times 10^{-7}$,
        $A_8 = -6.0294 \times 10^{-10}$
    $N_{20}/\phi^4 = -2.22$,    $\phi^4 = 2.56 \times 10^{-6}$ wherein the reference symbols $r_1, r_2, \ldots$ represent radii of curvature on surfaces of respective lenses, the reference symbols $d_1, d_2, \ldots$ designate thicknesses of the respective lenses and airspaces reserved therebetween, the reference symbols $n_1, n_2, \ldots$ denote refractive indices of the respective lenses, and the reference symbols $\nu_1, \nu_2, \ldots$ represent Abbe's numbers of the respective lenses. Lengths such as $f_1, r_1, r_2, \ldots d_1, d_2$ and so on are expressed in units of millimeters.

The numerical data of the embodiments described above were obtained by ray-tracing from a side of an eye point and the eye point is located at $r_0$ (stop). Further, dispersion parameters $V_{00}, V_{10}, V_{20}, \ldots$ for partial dispersion were calculated according to Herzberger's formula for partial dispersion ratios and terms of high orders $V_{20}, V_{30}, \ldots$ were calculated uniformly as 0.3.

An eyepiece system preferred as the first embodiment of the present invention has a composition illustrated in FIG. 1, wherein the lens system is composed of a single biconvex GRIN lens which is made of a medium having a negative power. The first embodiment is configured so as to satisfy the conditions (1), (2) and (3).

Figure 2:
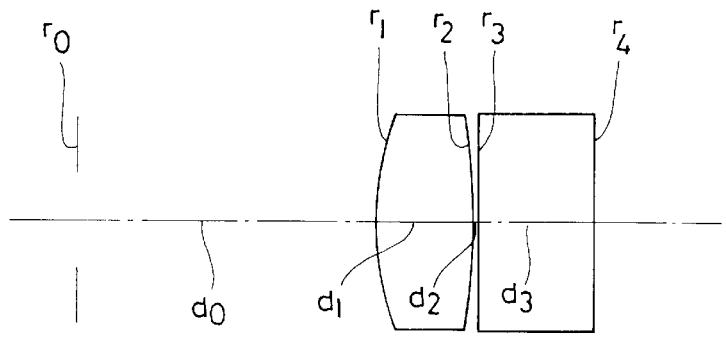

An eyepiece system preferred as the second embodiment of the present invention has a composition illustrated in FIG. 2, wherein the lens system is composed of a biconvex homogeneous lens and a radial type GRIN lens. The radial type GRIN lens has planar surfaces on both sides and can be easily manufactured. Further, the GRIN lens is made of a medium having a negative power. The second embodiment is also configured so as to satisfy the conditions (1), (2) and (3).

Figure 3:
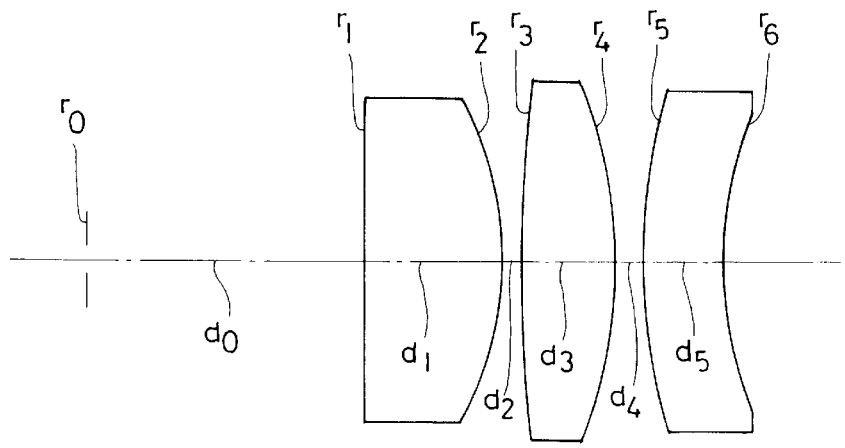

An eyepiece system preferred as the third embodiment of the present invention has a composition illustrated in FIG. 3, wherein the lens system is composed of a first lens unit consisting of a radial type GRIN lens which has a planoconvex shape and a negative refractive power, and a second lens unit comprising a positive biconvex homogeneous lens and a negative meniscus lens. The third embodiment is also configured to satisfy the conditions (1), (2) and (3).

Figure 4:
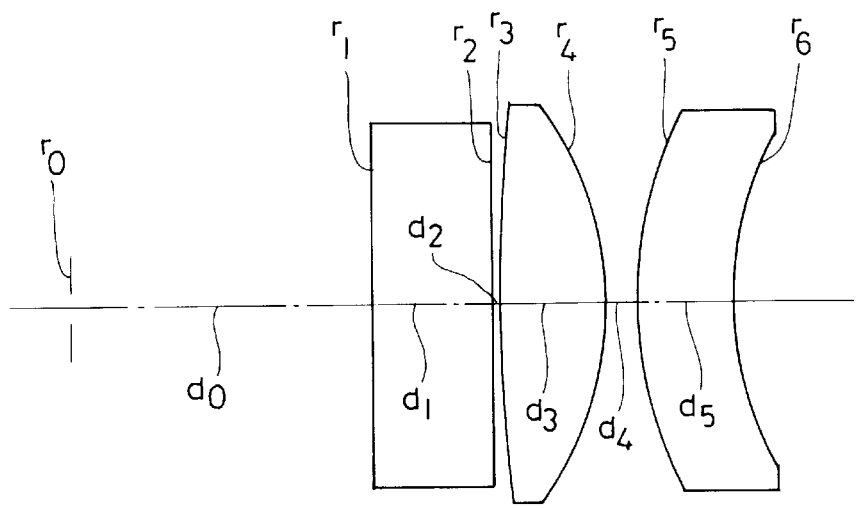

An eyepiece system preferred as the fourth embodiment of the present invention is composed as illustrated in FIG. 4, wherein the lens system consists of a first lens unit composed of a radial type GRIN lens which is made of a medium having a negative refractive power, and a second lens lens unit comprising a biconvex homogeneous lens and a negative meniscus homogeneous lens. The radial type GRIN lens has planar surfaces on both sides.

The fourth embodiment also satisfies the conditions (1), (2) and (3).

Figure 5:
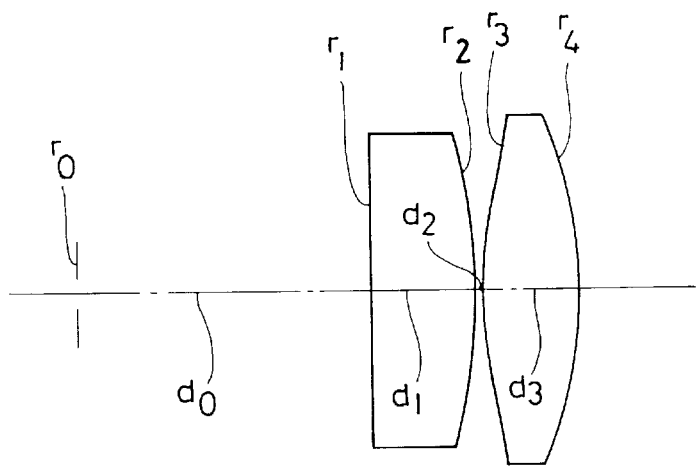

An eyepiece system preferred as the fifth embodiment of the present invention is composed as illustrated in FIG. 5, wherein the lens system consists of a first lens unit consisting of a radial type GRIN lens which has a plano-convex shape and is made of a medium having a negative refractive power, and a second lens unit consisting of a positive biconvex homogeneous lens.

In the eyepiece system preferred as the fifth embodiment, a surface of the biconvex homogeneous lens (third surface $r_3$) is configured as an aspherical surface. The eyepiece system preferred as the fifth embodiment satisfies the conditions (1), (2) and (3-1).

Figure 6:
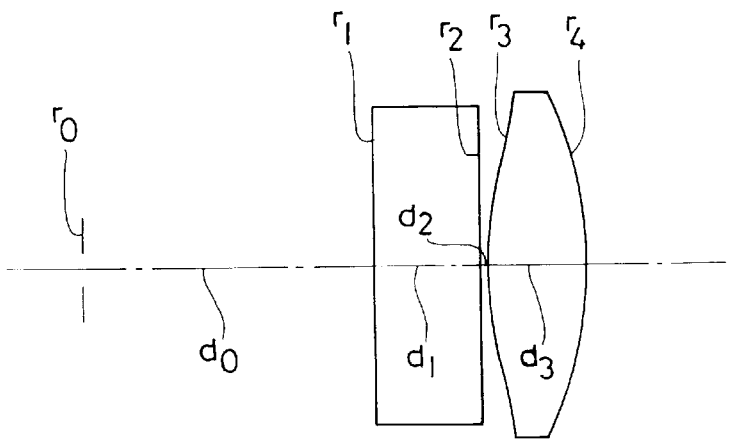

An eyepiece system preferred as the sixth embodiment of the present invention has a composition illustrated in FIG. 6, wherein the lens system is composed of a first lens unit consisting of a radial type GRIN lens which is made of a medium having a negative refractive power and a second lens unit consisting of a biconvex homogeneous lens. In this embodiment, the radial type GRIN lens has planar surfaces on both sides, whereas one surface of the biconvex homogeneous lens (third surface $r_3$) is configured as an aspherical surface. The sixth embodiment satisfies the conditions (1), (2) and (3-1).

Shapes of aspherical surfaces to be used in the eyepiece system according to the present invention are expressed by the following formula:

$$x = \frac{y^2/r}{1+\sqrt{1-(K+1)(y/r)2}} + A_4 y^4 + A_6 y^6 + A_8 y^8 + \ldots$$

wherein the reference symbol x represents a direction along an optical axis, the reference symbol y designates a direction perpendicular to the optical axis, the reference symbol r denotes a radius of curvature of a reference sphere, and the reference symbols K, $A_4$, $A_6$, $A_8$, . . . represent coefficients expressing an aspherical surface.

The eyepiece system according to the present invention is composed of an extremely small number of lenses, can be manufactured at a low cost, has favorably corrected aberrations such as chromatic aberration, curvature of field and spherical aberration, and is optimum for use in telescopes, microscopes and other instruments for observing magnified images of objects.

What is claimed is:

1. An eyepiece system comprising:

a first lens unit comprising at least one gradient index lens which has a refractive index varying dependently on distances from an optical axis in a radial direction and has a negative refractive power of medium; and a second lens unit comprising at least one homogeneous lens which has a positive power, wherein said gradient index lens satisfies the following conditions (2) and (3-1):

$$d \geq 4 \text{ mm} \quad (2)$$

$$-5 < N_{20}/\phi^4 < 0 \quad (3\text{-}1)$$

wherein the reference symbol d represents a thickness of said gradient index lens, the reference symbol $\phi$ represents a refractive power of said eyepiece system, $N_{20}$ designates a coefficient of the fourth order of a refractive index N(r) of said gradient index lens which is given by the following formula (a):

$$N(r) = N_{00} + N_{10} r^2 + N_{20} r^4 + \quad (a)$$

wherein the reference symbol r represents a distance from the optical axis in the radial direction, the reference symbol $N_{00}$ designates a refractive index on the optical axis, and the reference symbols $N_{10}$, $N_{20}$, . . . denote coefficients of the second, fourth, . . . orders.

2. An eyepiece system according to claim 1, wherein said gradient index lens satisfies a following condition (1):

$$0 < V_{10} < V_{00} \quad (1)$$

wherein the reference symbol $V_{00}$ represents an Abbe's number on the optical axis and the reference symbol $V_{10}$ designates a dispersion coefficient given by the following formula:

$$V_{10} = N_{10d}/(N_{10F} - N_{10C})$$

wherein the reference symbols $N_{10d}$, $N_{10F}$ and $N_{10C}$ represent values of a coefficient of the second order $N_{10}$ for the d-line, F-line and C-line at a refractive index N(r) of a gradient index lens which is given by the following formula (a):

$$N(r) = N_{00} + N_{10} r^2 + N_{20} r^4 + \quad (a)$$

wherein the reference symbol r represents a distance from the optical axis in the radial direction, the reference symbol Noo designates a refractive index on the optical axis, and the reference symbols $N_{10}$, $N_{20}$, . . . denoto effiients of the sond, fourth, . . . orders.

3. An eyepiece system according to claim 2, wherein at least one aspherical surface is disposed in said second lens unit.

4. An eyepiece system according to claim 1, wherein said first lens unit comprises a single gradient index lens, and wherein said second lens unit comprises a first homogeneous lens having a positive power and a second homogeneous lens having a negative power.

5. An eyepiece system according to claim 3, wherein said aspherical surface is disposed so as to correct distortion, pupil aberration and pupil chromatic aberration.

6. An eyepiece system consisting of a single gradient index lens whose refractive index varies dependently on distances from an optical axis in a radial direction, wherein a medium of said gradient index lens has a negtive refractive power and said gradient index lens satisfies the following conditions (1) and (2):

$$0 < V_{10} < V_{00} \quad (1)$$

$$d \geq 4 \text{ mm} \quad (2)$$

wherein the reference symbol d represents thickness of said gradient index lens, the reference symbol $V_{00}$ represents an Abbe's number on the optical axis and the reference symbol $V_{10}$ designates dispersion coefficient given by the following formula:

$$V_{10} = N_{10d}/(N_{10F} - N_{10C})$$

wherein the reference symbols $N_{10d}$, $N_{10F}$ and $N_{10C}$ represent values of a coefficient of the second order $N_{10}$ for the d-line, F-line and C-line at a refractive index N(r) of a gradient index lens which is given by the following formula (a):

$$N(r) = N_{00} + N_{10} r^2 + N_{20} r^4 +$$

wherein the reference symbol r represents a distance from the optical axis in the radial direction, the reference symbol $N_{00}$ designates a refractive index on the optical axis, and the reference symbols $N_{10}$, $N_{20}$, ... denote coefficients of the second, fourth, ... orders.

7. An eyepiece system consisting of:

a single gradient index lens whose refractive index varies dependently on distances from an optical axis in a radial direction, wherein a medium of said gradient index lens has a negative refractive power and said gradient index lens satisfies the following conditions (1) and (3):

$$0 < V_{10} < V_{00} \tag{1}$$

$$0 < N_{20}/\phi^4 < 8 \tag{3}$$

wherein the reference symbol $\phi$ represents a refractive power of said eyepiece system, the reference symbol $V_{00}$ represents an Abbe's number on the optical axis and the reference symbol $V_{10}$ designates a dispersion coefficient given by the following formula:

$$V_{10} = N_{10d}/(N_{10F} - N_{10C})$$

wherein the reference symbols $N_{10d}$, $N_{10F}$ and $N_{10C}$ represent values of a coefficient of the second order $N_{10}$ for the d-line, F-line and C-line at a refractive index $N(r)$ of a gradient index lens which is given by the following formula (a):

$$N(r) = N_{00} + N_{10}r^2 + N_{20}r^4 +$$

wherein the reference symbol r represents a distance from the optical axis in the radial direction, the reference symbol $N_{00}$ designates a refractive index on the optical axis, and the reference symbols $N_{10}$, $N_{20}$, ... denotes coefficients of the second, fourth, ... orders.

8. An eyepiece system comprising, in order from the object side, of:

a homogeneous lens having a positive power; and a gradient index lens whose refractive power varies dependently on distances from an optical axis in a radial direction, wherein a medium of said gradient index lens has a negative power, wherein said gradient index lens satisfies the following conditions (2) and (3-1):

$$d \geq 4 \text{ mm} \tag{2}$$

$$-5 < N_{20}/\phi^4 < 0 \tag{3-1}$$

wherein the reference symbol d represents a thickness of said gradient index lens, the reference symbol $\phi$ represents a refractive power of said eyepiece system, $N_{20}$ designates a coefficient of the fourth order of a refractive index $N(r)$ of said gradient index lens which is given by the following formula (a):

$$N(r) = N_{00} + N_{10}r^2 + N_{20}r^4 + \tag{a}$$

wherein the reference symbol r represents a distance from the optical axis in the radial direction, the reference symbol $N_{00}$ designates a refractive index on the optical axis, and the reference symbols $N_{10}$, $N_{20}$, ... denote coefficients of the second, fourth, ... orders.

9. An eyepiece system according to claim 1, 2, 6, 7 or 8 wherein the gradient index lens has at least one planar surface.

10. An eyepiece system according to claim 1, 2, 6, 7 or 5 wherein said gradient index lens has planar surfaces on both sides.

* * * * *